Patented July 30, 1935

2,009,554

UNITED STATES PATENT OFFICE 2,009,554

PROCESS OF PRODUCING PURE MERCAPTANS

Antoine Eugène Lacomble, San Mateo, Calif., assignor to Shell Development Company, San Francisco, Calif., a corporation of Delaware No Drawing. Application November 10, 1931, Serial No. 574,230

6 Claims. (Cl. 260—156)

This invention relates to the production of substantially pure mercaptans from hydrocarbon mixtures containing same, and more specifically to the recovery thereof by the fractionation of such hydrocarbon mixtures, particularly those derived from cracking petroleum.

My invention consists of producing by fractionation from a mixture of hydrocarbons containing mercaptans a narrow fraction containing a definite mercaptan, such as methyl or ethyl mercaptan, substantially free from other mercaptans. From the isolated narrow fraction the desired mercaptan is separated by treating this fraction by suitable means, such, for example, as treating it in the vapor phase with a liquid alkaline solution; the mercaptide formed in this treatment may be further treated to produce the corresponding mercaptan.

In carrying out my process I may start with any mixture of hydrocarbons containing mercaptans. For producing the lowest members of this group of compounds, i. e., methyl or ethyl mercaptan, I prefer, however, to use the light fraction obtained from stabilizing pressure distillate resulting from the cracking of petroleum oils. This preferred material, comparatively high in the desired substances, normally comprises, besides methyl and ethyl mercaptans, also higher mercaptans, sulfides, disulfides, saturated hydrocarbons, such as propane, isobutane, butane, various pentanes, etc., and unsaturated hydrocarbons, such as propylene, butylenes, amylenes, etc.

I rectify this material very closely in a series of columns, for the production of a fraction high in the desired mercaptan, such as either ethyl or methyl mercaptan, and not containing any other mercaptan.

Up to the present it has been customary, when fractionating hydrocarbon mixtures, either to remove all mercaptans as completely as possible before fractionation, for instance, by a soda treatment or by a doctor treatment, or to fractionate the whole mixture without particular regard for the properties of the mercaptans contained therein, resulting in fractions containing more than one mercaptan from which pure mercaptans could be obtained by such simple operations like absorption in soda and acidifying the resultant solution, as done in my process.

According to my invention the fractionation is conducted with sole respect to the desired mercaptan, irrespective of the particular hydrocarbon fraction in which it is dissolved. For the production of this fraction in which, besides non-mercaptans, only one particular mercaptan is present, I use a plurality of efficient fractionating columns, and although not limited thereto, I prefer to use a fractionating system comprising a series of rectifying columns working in co-operation with each other on the backfeed principle, as described in the patent to Carney, No. 1,957,818, issued May 8, 1934.

Using such a fractionating system, I have found that under a certain fixed relation of pressure and temperature, I can obtain at a certain point of the fractionating system a product consisting of hydrocarbons containing only methyl mercaptan, free from heavier mercaptans, while at another point of the system I can obtain a product containing in solution only ethyl mercaptan.

I have also found that the points of the fractionating system, where I obtain the hydrocarbon products containing the pure methyl or ethyl mercaptans, change not only with the pressure and temperature used in the system, but also with the composition of the raw material.

As a matter of illustration the following specific example of the production of pure mercaptans is given:—

A raw material of approximate boiling range 10°–180° C. was produced by the stabilization of cracked petroleum distillate, and contained among others the following components, the boiling-points of which are given at atmospheric pressure:

| | Boiling point degrees C. |
|---|---|
| Normal pentane | 37 |
| Iso butane | −11 |
| Iso butylene | −6 |
| α butylene | −5 |
| Normal butane | 1 |
| Trans β butylene | ¾ |
| Cis β butylene | 3 |
| Methyl mercaptan | 5.8 |
| Iso propyl ethylene | 21 |
| Iso amylene | 25 |
| Iso pentane | 31 |
| Ethyl-methyl-ethylene | 36.5 |
| Trimethyl-ethylene | 37 |
| Ethyl mercaptan | 36–37 |
| Iso-propyl mercaptan | 60 |
| Normal hexane | 69 |

This raw material was fractionated in a series of fractionating columns, producing the following four products listed in order of gravity.

The first product was the lightest fraction of hydrocarbons comprising: iso butane, iso butylene and substantially all of the desired methyl mercaptan, which was present in the raw material.

The operating pressure of the column producing this fraction was 75 lbs./sq. in. gauge, with the temperature at the top 52° C. The narrow fraction obtained under these conditions as the top product, and containing methyl mercaptan, as the only member of the mercaptan group, had a boiling range from —12° C. to —7° C. at atmospheric pressure.

The second product was a low boiling intermediate fraction of hydrocarbon comprising: iso butylenes, α butylene, normal butane, trans β butylene, cis β butylene and only traces of methyl and ethyl mercaptans.

The third product was a higher boiling intermediate fraction of hydrocarbons comprising: isopropyl ethylene, iso-amylene, iso-pentane and substantially all the ethyl mercaptan, which was originally present in the raw material.

This column was operated under a pressure of 25 lbs./sq. in. gauge, with a temperature of 49° C. at the top. The product taken at the top of the column and containing no other mercaptans but ethyl mercaptan boiled at 15°–21° C. under atmospheric pressure.

The fourth product was the remainder of the heavier components of the raw material.

To obtain substantially pure methyl mercaptan contained in the first product, this light fraction was passed in the vapor phase in counter-current contact with an aqueous caustic soda solution of about 16° Bé. gravity.

To avoid condensation of the higher boiling components in this scrubbing operation the temperature of the absorbing caustic solution was maintained substantially above the boiling point of the heaviest components in the mixture at the prevailing pressure. This insured efficient and complete removal of the methyl mercaptan as methyl mercaptide. From this methyl mercaptide solution the methyl mercaptan was recovered in a conventional manner by acidifying solution with $H_2SO_4$ and separating the methyl mercaptan.

The third product containing ethyl mercaptan in solution, was subjected to a similar vapor phase treatment to form ethyl mercaptide, and the ethyl mercaptan was subsequently regenerated from this solution.

In my process, when applied to cracked distillates, I have found that the methyl mercaptan, which boils under atmospheric pressure at 5.8° C., distills over with a hydrocarbon, or hydrocarbon mixture, boiling at considerably lower temperature at atmospheric pressure, namely, between —12° C. and —7° C., and I also found that the hydrocarbon or hydrocarbon mixture with which it will distill over varies with the conditions of temperature and pressure in the fractionating system. The ethyl mercaptan has analogous characteristics.

A mercaptan can be recovered from the narrow hydrocarbon fraction in a number of various ways, but I prefer the method described above, viz., treating the fraction in the vapor phase with a solution which remains a liquid during the treatment and readily dissolves the mercaptan compound formed because this effects an easy and practically complete separation between mercaptan and hydrocarbons, which separation is far more complicated when other methods are used. Preferably I use an alkaline solution, particularly caustic soda, though substitution of other reagents such as $CuSO_4$ is within the skill of a chemist.

Although the present invention has been described in connection with the specific details of certain embodiments thereof, these details are not intended to be regarded as limitations upon the scope of the invention except insofar as included in the accompanying claims.

I claim as my invention:

1. As a product of fractional distillation, a mixture of hydrocarbons comprising essentially isobutane and isobutylene, having in solution methyl mercaptan substantially free from other mercaptans and hydrocarbons.

2. As a product of fractional distillation, a mixture of hydrocarbons comprising essentially iso-propyl ethylene, iso-amylene, and iso-pentane having in solution ethyl mercaptan, substantially free from other mercaptans and hydrocarbons.

3. In a process of concentrating mercaptans from a cracked petroleum distillate containing them, the step of fractionating said distillate under superatmospheric pressure to produce a fraction normally boiling between about —12° C. and —7° C. which contains hydrocarbons and only methyl mercaptans.

4. In a process of concentrating mercaptans from a cracked petroleum distillate containing them, the step of fractionating said distillate under superatmospheric pressure to produce a fraction normally boiling between about 15° C. and 21° C. which contains hydrocarbons and only ethyl mercaptans.

5. In a continuous process of separating individual mercaptans from hydrocarbon mixtures containing several aliphatic mercaptans, the steps of subjecting said mixture to a fractional distillation under superatmospheric pressure in a fractionating system, simultaneously withdrawing from different points of the system several hydrocarbon fractions containing, respectively, only methyl and ethyl mercaptans and hydrocarbons normally boiling below the boiling point of the respective mercaptan in the hydrocarbon fraction, and withdrawing from said system alternating fractions substantially free from methyl and ethyl mercaptans.

6. In a continuous process of separating ethyl and methyl mercaptans from hydrocarbon mixtures by fractionation in a series of fractionating columns, the steps comprising fractionally distilling the hydrocarbon-mercaptan mixture under a superatmospheric pressure of the order of 75 lbs. per sq. in. and top temperature of the order of 52° C. in one of the columns to produce a top product consisting of methyl mercaptan and hydrocarbons normally boiling at temperatures below about 5.8° C., and continuing fractionation under a superatmospheric pressure of the order of 25 lbs. per sq. in. and a top temperature of the order of 49° C. in another column to produce a top product consisting of ethyl mercaptan and hydrocarbons normally boiling at temperatures below about 36° C.

ANTOINE EUGÈNE LACOMBLE.